United States Patent [19]
Archibald

[11] Patent Number: 5,421,642
[45] Date of Patent: Jun. 6, 1995

[54] BIMETAL FULL FACE WHEEL

[75] Inventor: Kenneth R. Archibald, Canton, Mich.

[73] Assignee: Hayes Wheels International, Inc., Romulus, Mich.

[21] Appl. No.: 187,928

[22] Filed: Jan. 27, 1994

[51] Int. Cl.⁶ .............................................. B60B 23/00
[52] U.S. Cl. ......................................... 301/65; 301/95
[58] Field of Search .................. 301/63.1, 65, 95, 97, 301/64.2, 64.3

[56] References Cited

U.S. PATENT DOCUMENTS

| | | | |
|---|---|---|---|
| 3,250,572 | 5/1966 | Walker | 301/65 |
| 3,361,484 | 1/1968 | Frank | 301/65 |
| 3,399,930 | 9/1968 | Bennett | 301/65 |
| 3,506,311 | 4/1970 | Nobach | 301/63.1 |
| 5,257,455 | 11/1993 | Iwatsuki | 301/63.1 X |

*Primary Examiner*—Russell D. Stormer
*Attorney, Agent, or Firm*—MacMillan, Sobanski & Todd

[57] ABSTRACT

A bimetal full face wheel having an improved structure for attaching a preformed partial wheel rim to a full face cast wheel disk. The improved structure includes a weld anchor having a cylindrical sleeve with a flange extending radially outwardly from one end thereof. The flange is secured to an inboard surface of the wheel disk rim. The wheel rim includes a cylindrical outboard end which is pressed over the anchor sleeve. The outboard end of the wheel rim is welded to the weld anchor.

10 Claims, 4 Drawing Sheets

BIMETAL FULL FACE WHEEL

BACKGROUND OF THE INVENTION

This invention relates in general to vehicle wheels and in particular to wheels having a separately formed wheel rim attached to a cast full face wheel disk.

It is known in the art to fabricate a vehicle wheel by attaching a rolled steel wheel rim to a wheel disk cast from a light weight metal, such as aluminum, titanium or magnesium or an alloy thereof. Such a wheel is referred to as a bimetal wheel and combines the economy, flexibility and strength of a steel rim with the pleasing ornamental appearance of three dimensional contours formed in a cast wheel disk.

To further enhance the appearance of a bimetal wheel, it is known to radially extend the wheel disk to include the outer tire bead retaining flange. Such a wheel disk is referred to as a full face wheel disk. The full face wheel disk is attached to a truncated end of a partial wheel rim having only an inner tire bead retaining flange. The assembled full face wheel disk and partial wheel rim is called a full face wheel. When a tire is mounted upon a full face wheel, the joint between the wheel rim and the wheel disk is completely hidden.

Referring to FIG. 1, there is shown, generally at 10, a sectional view of a typical prior art bimetal full face wheel. The wheel 10 includes a full face wheel disk 11 cast from a light metal or alloy. The wheel disk 11 has a ring shaped rim 12 which includes an outboard bead seat flange 13. The flange 13 has an inboard surface 14 that faces a vehicle (not shown) when the wheel 10 is mounted thereon. The wheel disk 11 also includes a ring-shaped weld anchor 15 formed from a ferrous material, such as steel. The weld anchor 15 is partially embedded in the flange inboard surface 14. As best seen in the fragmentary sectional view of the wheel 10 shown in FIG. 2, a portion of the weld anchor 15 is exposed to form a welding surface 16. An inboard annular-shaped portion 17 of the wheel disk 11 overlaps a portion of the weld anchor 15, forming a cylindrical shoulder 18 extending perpendicularly away from the weld anchor 15.

A conventional drop-center partial wheel rim 20 is attached to the wheel disk 11. The wheel rim 20 can be formed from steel strip stock with conventional rim roll forming machinery. The wheel rim 20 includes a conventional inboard bead seat flange 21 and a cylindrically-shaped outboard end 22. The outboard rim end 22 extends axially over the shoulder 18 formed on the annular portion 17 of the wheel disk 12. The outboard rim end 22 and the wheel disk annular portion 17 are sized to form a clearance fit therebetween, allowing the wheel rim 20 to be rotated relative to the wheel disk 11.

The wheel rim 20 is attached to the weld anchor 15 by a continuous air-tight weld 25 formed between the weld anchor 15 and the wheel outboard rim end 22. The weld 25 is typically formed by a conventional friction or inertial welding process wherein the wheel disk 11 is held stationary while the outboard rim end 22 is rotated against the weld anchor 15. During the welding process, the weld 25 is formed having a weld radius 26 for seating a tire bead. Accordingly, the weld radius 26 generally matches the radius formed on the inboard bead seat flange 21.

SUMMARY OF THE INVENTION

This invention relates to a vehicle wheel having an improved structure for attaching a partial wheel rim to a full face wheel disk and a method for forming same.

The weld 25 in the typical bimetal full face wheel 10 described above requires a clearance fit between the wheel disk shoulder 18 and the wheel rim 20. Thus, the wheel disk shoulder 18 does not carry any of the wheel load. Accordingly, all of the wheel load is carried by the weld 25. This requires a strong weld to preclude separation of the rim 20 from the wheel disk 11 during use of the wheel 10. Furthermore, the clearance fit may allow the rim 20 to be eccentric to the wheel disk 11, causing vibration when the wheel 10 rolls. Thus, there is a need for an improved structure for attaching the wheel rim 20 to the wheel disk 11.

The present invention contemplates a bimetal full face wheel having an improved structure for attaching a full face wheel disk formed from a light weight metal or alloy thereof to a preformed partial wheel rim. The improved wheel structure includes an improved weld anchor that has a cylindrical sleeve with a ring-shaped flange extending radially from one end thereof. The weld anchor flange is secured to an inboard surface of the wheel disk with the sleeve extending axially away from the wheel disk inboard surface. The sleeve includes an outer surface which is concentric with the wheel disk. The wheel rim includes a cylindrically-shaped end portion which extends axially over the anchor sleeve to form an interference fit. A circular airtight weld between the wheel rim end and the weld anchor securely attaches the wheel rim to the wheel disk.

One method of forming the wheel structure includes placing the improved weld anchor in a wheel disk mold. A full face wheel disk is cast over a portion of the weld anchor flange with the anchor sleeve extending axially away from a wheel disk inboard surface. Alternately, the wheel disk can be forged over or stamped onto the weld anchor. The radial outer surface of the anchor sleeve is machined to be concentric with the wheel disk axis. Separately from forming the wheel disk, a wheel rim is formed having a cylindrically-shaped end. The anchor sleeve is received by the cylindrically-shaped wheel rim end with an interference fit formed therebetween. The interference fit can be formed by pressing the wheel rim end over the anchor sleeve, or by heating the wheel rim end and shrink fitting the wheel rim end onto the anchor sleeve. The wheel rim is then secured to the anchor flange by a conventional welding process, such as arc welding.

The interference fit between the wheel rim and the anchor sleeve assures that the wheel rim is concentric with the wheel disk. Because the anchor sleeve extends axially into the rim end, the sleeve forms a backing surface for the weld which prevents weld blowthrough. Any holes caused by weld blowthrough would allow air to leak from a tire mounted upon the wheel. Additionally, the anchor sleeve supports the wheel rim and thereby absorbs a portion of the tire load between the wheel disk and the wheel rim. This divides the tire load between the weld anchor and the weld, reducing the stress applied to the weld and thereby increasing wheel reliability.

Other advantages of this invention will become apparent to those skilled in the art from the following

DETAILED DESCRIPTION OF THE PREFERRED EMBODIMENT

Figure 1:
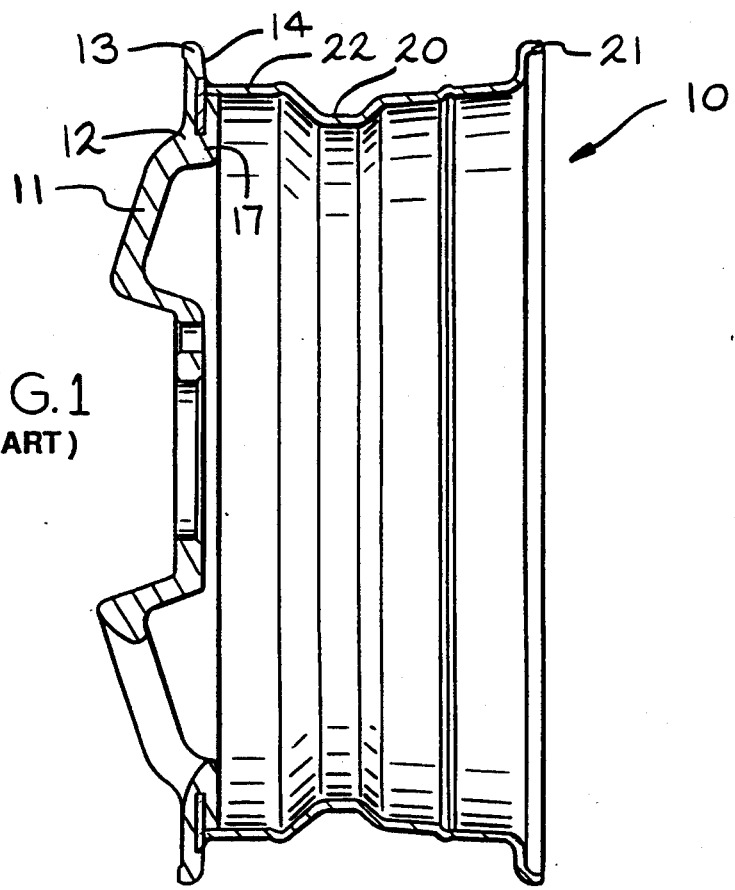
FIG. 1 is a sectional view of a prior art bimetal wheel having a partial wheel rim attached to a full face wheel disk.
Figure 2:
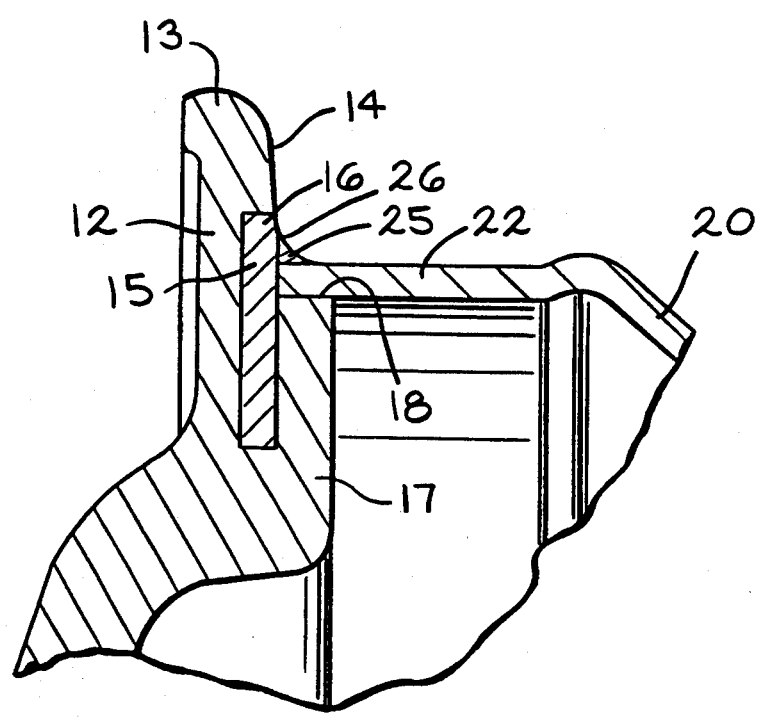
FIG. 2 is a fragmentary sectional view of the wheel in FIG. 1 which illustrates a prior art structure for attaching the partial wheel rim to a full face wheel disk.
Figure 3:
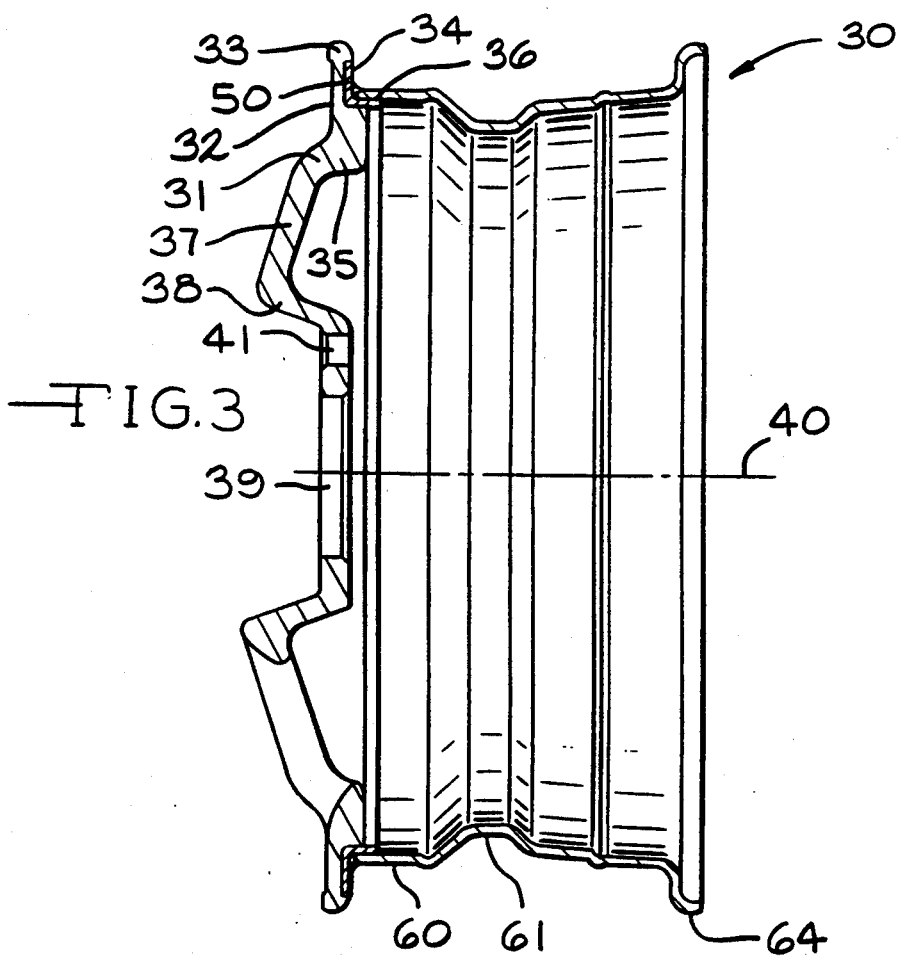
FIG. 3 is a sectional view of a bimetal wheel having a partial wheel rim attached to a full face wheel disk in accordance with the invention.

Referring now to FIG. 3, there is illustrated, generally at 30, a bimetal full faced wheel having an improved structure in accordance with the invention. The wheel 30 includes a full face wheel disk 31. In the preferred embodiment, the wheel disk 31 is cast by a conventional casting method, such as gravity or low pressure casting, from a light metal such as aluminum, titanium or magnesium, or an alloy thereof. Alternatively, the wheel disk 31 can be forged from a blank of metal or stamped from a metal sheet.

The wheel disk 31 includes a ring shaped rim 32 which has an outboard bead seat flange 33. The wheel disk rim 32 defines an inboard surface 34 which faces a vehicle (not shown) when the wheel 30 is mounted thereon. An annular ring 35 extends axially from the inboard surface 34 of the wheel disk rim 32. The annular ring 35 is concentric with the wheel disk 31 and includes a radial outer surface which forms a shoulder 36. A plurality of spokes 37, one of which is shown in FIG. 3, extend from the wheel disk rim 32 to a central wheel hub 38. The wheel hub 38 has a pilot hole 39 formed through the center thereof. The pilot hole 39 is adapted to receive the end of a vehicle hub (not shown). A wheel disk axis 40 passes through the center of the pilot hole 39 perpendicular to the wheel disk 31. The hub 38 also includes a plurality of stud holes 41, one of which is shown in FIG. 3, formed axially therethrough in a concentric array about the pilot hole 39. The stud holes 41 are adapted to receive wheel studs (not shown) for attaching the wheel 30 to a vehicle.

Figure 4:
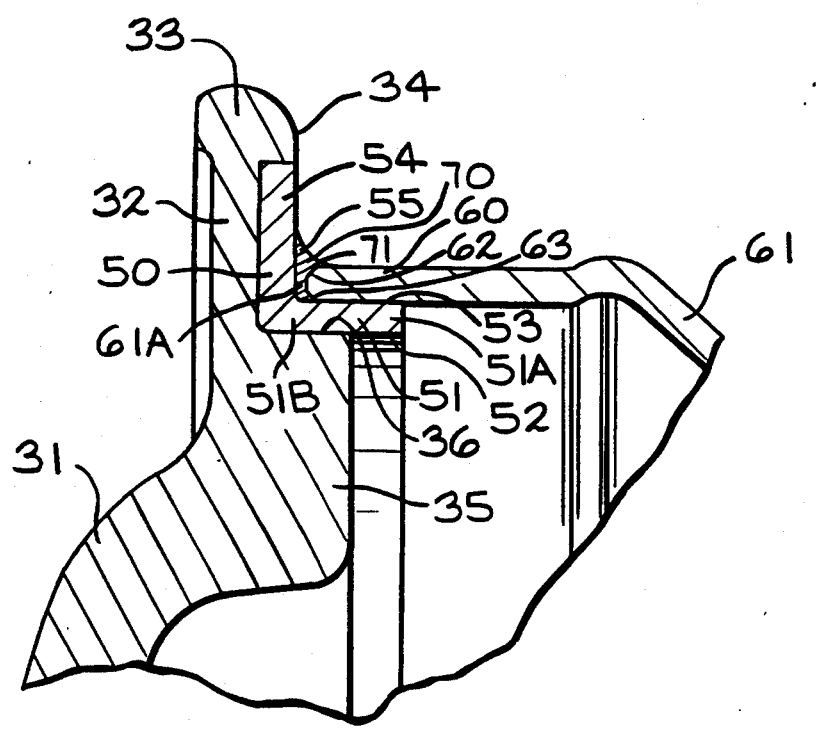
FIG. 4 is a fragmentary sectional view of the wheel in FIG. 3 which illustrates a structure in accordance with the invention for attaching the partial wheel rim to a full face wheel disk.

As best seen in FIG. 4, the wheel 30 includes an improved weld anchor 50. In the preferred embodiment, the weld anchor 50 is formed from a ferrous material, such as steel, by a conventional process, such as stamping or drawing. The anchor 50 includes a cylindrical sleeve 51 having an inner surface 52 and an outer surface 53. As will be explained below, the outer surface 53 is concentric with the wheel disk 31. The shoulder 36 formed on the inboard surface 34 of the wheel disk rim 32 extends axially into the sleeve 51 and contacts the sleeve inner surface 52, providing mechanical support for the weld anchor 50. A first end portion 51A of the sleeve 51 extends axially away from the wheel disk 31.

The weld anchor 50 also includes a circular anchor flange 54 which extends radially outwardly from a second end portion 51B of the sleeve 51. As shown in FIG. 4, the flange 54 lies in a plane that is generally perpendicular to the sleeve 51. Also as shown in FIG. 4, the wheel disk rim 32 is formed over a portion of the flange 54. However, an inboard radial surface 55 of the flange 54 is exposed. As will be described below, the weld anchor 50 is mechanically bonded to the wheel disk 31.

A cylindrically-shaped outer end 60 of a conventional drop-center type partial wheel rim 61 extends axially over the second end 53 of the weld anchor 50 to form an annular-shaped space 61A therebetween. In the preferred embodiment, the wheel rim 61 is formed from strip steel stock by conventional manufacturing processes. As will be described below, the wheel rim 61 is concentric with the wheel disk 31. The wheel rim outer end 60 has chamfered edges 62 and 63, the purpose of which will be described below. The wheel rim 61 also includes a conventional inboard bead seat flange 64.

The wheel rim end 60 and the anchor sleeve 51 are sized to form an interference fit therebetween. The interference fit assures that the wheel disk 31 is concentric with the wheel rim 61. In the preferred embodiment, a continuous circular air-tight weld 70 secures the wheel rim end 60 to the anchor flange 54 and a portion of the anchor sleeve 51. A conventional welding process, such as arc welding is used to form the weld 70. The weld 70 is formed having a radius 71 for seating a tire bead. Accordingly, the weld radius 71 generally matches the corresponding radius formed on the inboard bead seat flange 64. As an alternate, a plurality of discontinuous welds can be formed that are equally spaced circumferentially about the juncture of the weld anchor 50 and the rim end 60. When this is done, an air-tight polymer (not shown) is applied between the individual welds to assure an air-tight seal between the weld anchor 50 and the wheel rim end 60.

It will be appreciated that, while the improved wheel 30 has been described above as having a wheel rim 61 formed from steel, other metals can be used therefor. Thus, the wheel rim 61 can be formed from a light weight metal, which differs from the metal used to form the wheel disk 31, by a casting or forging operation. For example, aluminum, titanium or magnesium, or an alloy thereof can be used for the wheel rim 61. When metals other than steel are used for the wheel rim 61, the weld anchor 50 is formed from a similar metal to assure a strong weld between the wheel rim 61 and the weld anchor 50.

In the preferred embodiment, the wheel 30 is fabricated by first placing the weld anchor 50 in the portion of a wheel disk mold (not shown) which forms the the inboard surface 34 of the wheel disk rim 32. Molten metal is then added to the mold by a conventional casting process, such as gravity pouring or low pressure injection. As the molten metal solidifies, the weld anchor 50 is mechanically and/or chemically bonded thereto by a conventional means. For example, holes (not shown) can be formed through the anchor flange 54 which receive the molten metal. Upon cooling and solidification, the metal in the holes secure the weld anchor 50 to the wheel disk 31. As another example, the surface of the weld anchor 50 can be treated to bond to the wheel disk 31.

Alternatively, the wheel disk 31 can be forged by pressing a pair of dies over a heated metal blank. When this process is used, the weld anchor 50 is positioned on the die forming the inboard surface of the wheel disk 31 before the pressing operation. Additionally, a wheel disk and weld anchor assembly can be formed by positioning the weld anchor 50 on one of a pair of stamping dies and then stamping a metal blank between the dies.

The disk is machined as needed to form the finished wheel disk 31. During the machining, the pilot hole 39 and stud holes 41 are drilled through the wheel hub 38 and the inboard surface of the hub 38 is milled or turned on a lathe to provide a flat mounting surface. The outer surface 53 of the weld anchor sleeve 51 is turned on a lathe to assure that the surface 53 is concentric with the wheel disk axis 40. Similarly, the inboard surface of the wheel disk rim 34 is faced upon a lathe to assure that the flange inboard surface 55 is exposed and flush with the wheel disk inboard surface 34.

The partial wheel rim 61 is fabricated separately from the wheel disk 21 by a conventional process, such as coiling, butt welding and roll forming steel strip stock with conventional roll forming machinery. Alternatively, the wheel rim 61 can be cast by a conventional casting method, such as gravity or low pressure casting, or forged from a light metal such as aluminum, titanium or magnesium, or an alloy thereof. In the preferred embodiment, the outboard end 60 of the wheel rim is pressed over the second end 53 of the weld anchor sleeve 51 to form an interference fit therebetween. Alternately, the wheel rim 61 can be heated and shrink fitted onto the weld anchor sleeve 51. The chamfered edge 63 of the wheel rim end 60 functions to guide the wheel rim 61 onto the anchor sleeve 51.

Because the sleeve outer surface 53 is concentric with the wheel disk 31, the interference fit between the rim 61 and the anchor sleeve 51 centralizes the wheel rim 61 relative to the wheel disk 31. This assures that the wheel rim 61 is concentric with the wheel axis 40. Additionally, the interference fit between the wheel rim 61 and the anchor sleeve 51 assures that the anchor sleeve 51 carries a portion of the wheel loading.

In the preferred embodiment, the pressing operation is stopped before the wheel rim outer end 60 contacts the anchor flange 50 to form the annular gap 61A therebetween, as shown in FIG. 4. The gap 61A allows positioning the wheel rim 61 upon the anchor sleeve 51 with the inboard bead seat flange 64 formed on the end of the wheel rim 61 parallel to the outer tire bead retaining flange 33 formed on the wheel disk 31. The parallel flanges 64 and 33 provide a better dimensionality and control of axial and radial runout for the wheel 30. It will be appreciated that the pressing operation also can be continued until the rim end 60 bottoms out against the anchor flange inboard surface 55.

The wheel rim 61 is welded to the weld anchor 50 by a conventional welding process, such as arc welding. In the preferred embodiment, the welding process forms a continuous circular weld 70 which is air-tight and extends into and fills the gap 61A. Because the anchor sleeve 51 extends axially into the rim end 61, the sleeve outer surface 53 forms a backing surface for forming the weld 70. This eliminates weld blowthrough. As indicated above, in the preferred embodiment, the weld 70 is formed having an inboard weld radius 71 that becomes a portion of the outboard tire bead seat.

As described above, the weld 70 also can comprise a plurality of discontinuous welds that are equally spaced circumferentially about the juncture of the weld anchor 50 and the rim end 60. When this is done, an air-tight polymer (not shown) is applied between the individual welds to assure an air-tight seal between the weld anchor 50 and the wheel rim end 60.

As indicated above, a portion of the wheel load is transferred through the anchor sleeve 51. Accordingly, less wheel load is carried by the weld 70 than by the weld 25 in the prior art wheel 10, reducing the stress that the weld 70 is subjected to during wheel use. Additionally, as described above, the weld anchor flange 54 extends radially across a portion of the inner surface 34 of the wheel disk 31. When a tire (not shown) is mounted upon the wheel 30, the tire bead is retained by the exposed flange surface 55. Thus, the tire is retained on the wheel 30 by the weld anchor 50 which is welded to the wheel rim 61. This provides a stronger wheel structure than in the prior art wheel 10 where the tire is retained partially by the weld anchor 15 and partially by the wheel disk 11 which is mechanically bonded to the weld anchor 15.

Figure 5:
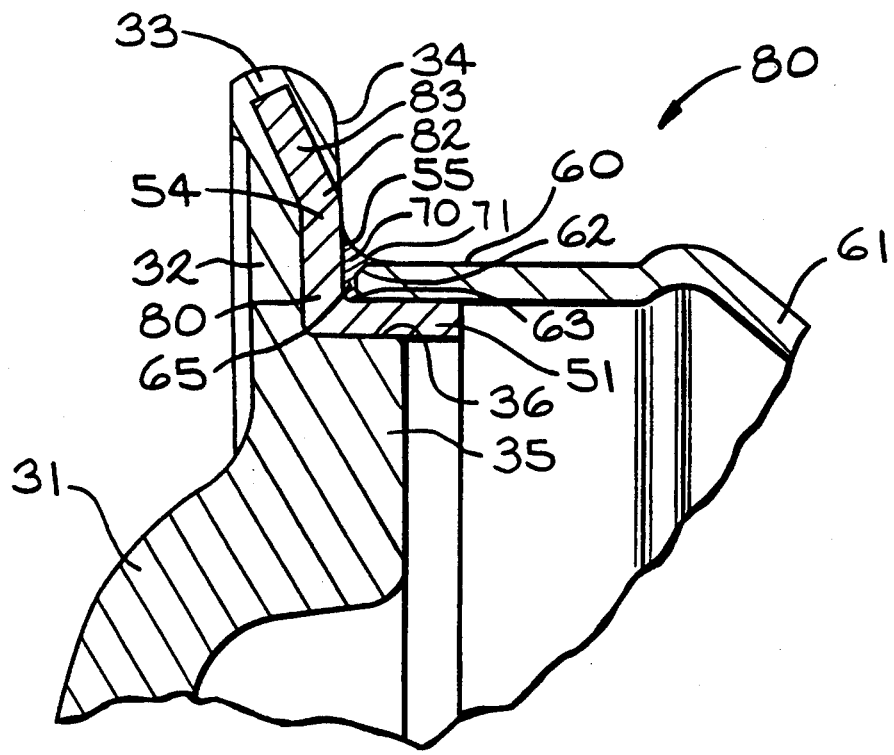
FIG. 5 is a fragmentary sectional view of a wheel which illustrates an alternate embodiment of the attachment structure shown in FIG. 4.

A fragmentary sectional view of an improved wheel 80 which includes an alternate embodiment of the present invention is shown in FIG. 5. Portions of the improved wheel 80 which are the same as shown in FIG. 4 are labeled the same. The wheel 80 includes an improved weld anchor 81 having a flange 82 that includes a first portion 54 extending radially from an anchor sleeve 51. The flange 82 also includes a ring-shaped second portion 83 extending at an angle from the circumference of the first portion and into the outboard bead seat flange 33. The extension of the anchor flange 82 into the outboard bead seat flange 33 to provide a stronger mechanical bond between the weld anchor 81 and the wheel disk 31. Additionally, a plurality of holes (not shown) can be formed through the flange second portion 83 to further increase the mechanical bonding between the flange 82 and the disk 31.

Figure 6:
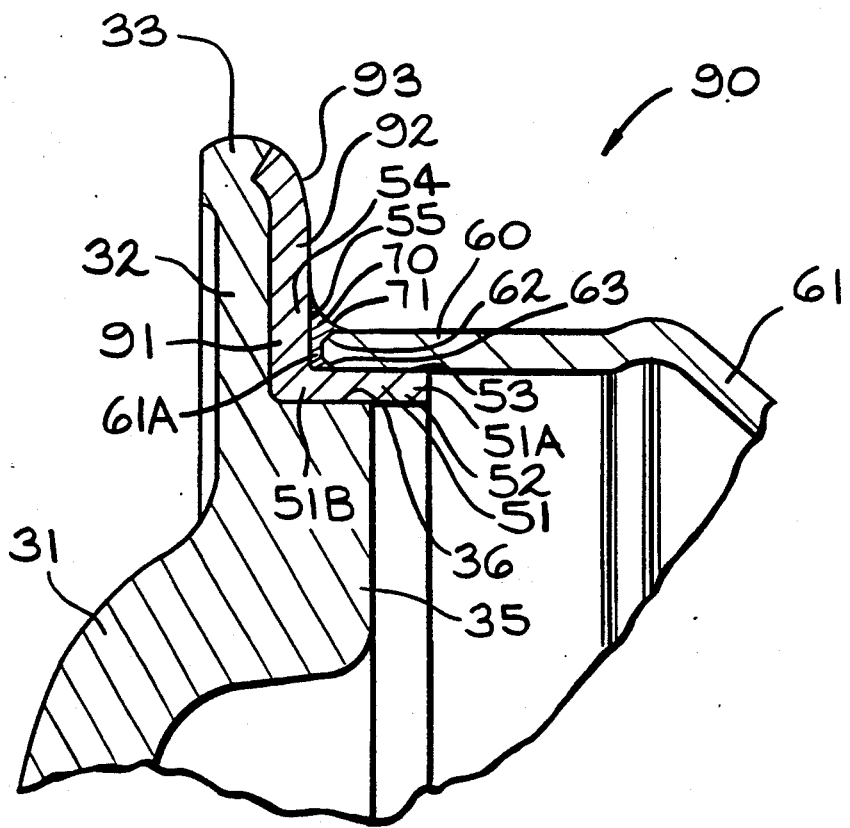
FIG. 6 is a fragmentary sectional view of a wheel which illustrates another embodiment of the attachment structure shown in FIG. 4.

A fragmentary sectional view of an improved wheel 90 which includes another embodiment of the present invention is shown in FIG. 6. Portions of the improved wheel 90 which are the same as shown in FIG. 4 are labeled the same. The wheel 90 includes an improved weld anchor 91 having a flange 92 that extends radially outward to form the inboard surface 93 of the wheel rim 32. With the structure shown in FIG. 6, machining of the wheel rim inboard surface 93 is not necessary.

Figure 7:
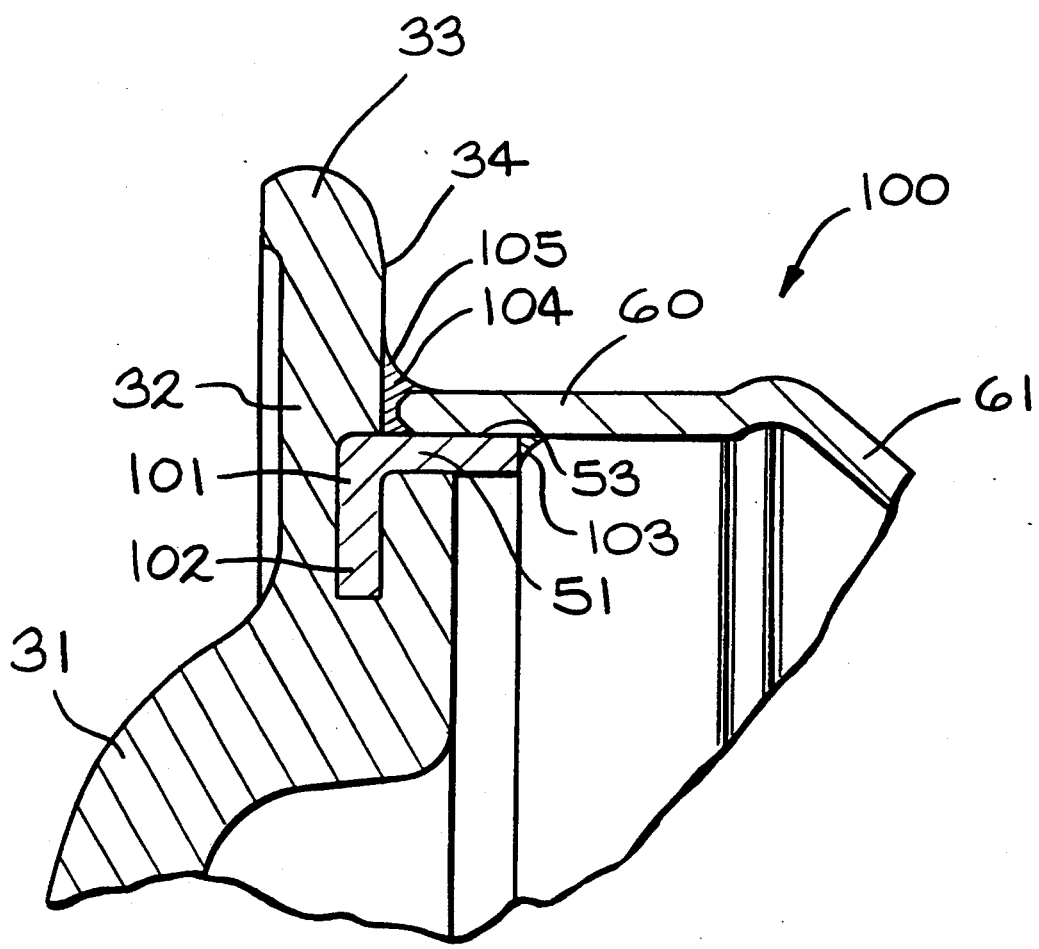
FIG. 7 is a fragmentary sectional view of a wheel which illustrates a further embodiment of the attachment structure shown in FIG. 4.

A fragmentary sectional view of an improved wheel 100 which includes a further embodiment of the present invention is shown in FIG. 7. Portions of the improved wheel 100 which are the same as shown in FIG. 4 are labeled the same. The wheel 100 includes an improved weld anchor 101 having a flange 102 that extends radially inward. A continuous circular weld 103 formed on the inside of the sleeve 51 secures the weld anchor 101 and wheel disk 31 to the wheel rim 61. The gap 61A between the end of the wheel rim 61 and the flange 102 is filled with an air tight polymer 104. Thus, the weld 103 does not need to be air-tight. The polymer 104 is formed having a radius 105 that generally matches the corresponding radius formed on the inner tire bead retaining flange 64. Alternatively, the weld 104 can consist of a plurality of welds spaced equally about the joint between the weld anchor 101 and the end of the wheel rim 60.

In accordance with the provisions of the patent statues, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle wheel comprising:
   a wheel disk formed from a nonferrous material, said wheel disk including an outboard bead seat flange;
   a weld anchor formed from a ferrous material, said weld anchor having a circular radial flange secured to an inboard side of said wheel disk in the region of said outboard bead seat flange, said weld anchor further including a cylindrical sleeve extending axially from said wheel disk rim inboard surface, said sleeve defining a cylindrical surface which is concentric with said wheel disk; and
   an annular wheel rim formed from a ferrous material, said wheel rim having a cylindrically-shaped end portion welded to said weld anchor.

2. The vehicle wheel, as described in claim 1, wherein said wheel disk includes an annular ring extending axially from said wheel disk inboard surface into said anchor sleeve; said annular ring contacting an inside surface of said anchor sleeve.

3. The vehicle wheel, as described in claim 1, wherein said wheel rim includes an inboard bead seat flange formed on an end opposite from said cylindrically-shaped end portion, said inboard bead seat flange being parallel to said wheel disk outboard bead seat flange.

4. The vehicle wheel, as described in claim 1, wherein said anchor flange extends radially outward from said anchor sleeve and said wheel rim end extends axially over said anchor sleeve.

5. The vehicle wheel, as described in claim 1, wherein said anchor flange extends radially inward from said anchor sleeve and said wheel rim end extends axially over said anchor sleeve.

6. A vehicle wheel comprising:
   a wheel disk including an outboard bead seat flange;
   a weld anchor having a circular radial flange secured to an inboard side of said wheel disk in the region of said outboard bead seat flange and extending at an angle within said outboard bead seat flange, said anchor including a cylindrical sleeve extending axially from said wheel disk rim inboard surface, said sleeve defining a cylindrical surface which is concentric with said wheel disk; and
   an annular wheel rim having a cylindrically-shaped end portion extending axially over said weld anchor sleeve and welded to said weld anchor.

7. A vehicle wheel comprising:
   a wheel disk formed from a first material, said wheel disk including an outboard bead seat flange;
   a weld anchor formed from a second material which is different from said first material, said weld anchor having a sleeve secured to an inboard side of said wheel disk in the region of said outboard bead seat flange and extending generally axially therefrom; and
   an annular wheel rim formed from said second material, said wheel rim having a generally cylindrically-shaped end portion welded to said weld anchor.

8. The vehicle wheel, as described in claim 7, wherein said weld anchor sleeve defines a cylindrical surface which is concentric with said wheel disk.

9. The vehicle wheel, as described in claim 7, wherein said weld anchor includes a generally radial flange extending from the outboard end of said weld anchor sleeve, said flange being secured to said wheel disk inboard surface.

10. The vehicle wheel, as described in claim 7, wherein said first material is a nonferrous metal and said second material is a ferrous metal.

* * * * *